Sept. 23, 1958 O. O. BERGE 2,853,273
ROPE DRUM DEVICE
Filed May 13, 1957 3 Sheets-Sheet 1

OLAV O. BERGE
INVENTOR.

BY
ATTORNEY

Sept. 23, 1958     O. O. BERGE     2,853,273
ROPE DRUM DEVICE
Filed May 13, 1957     3 Sheets-Sheet 2
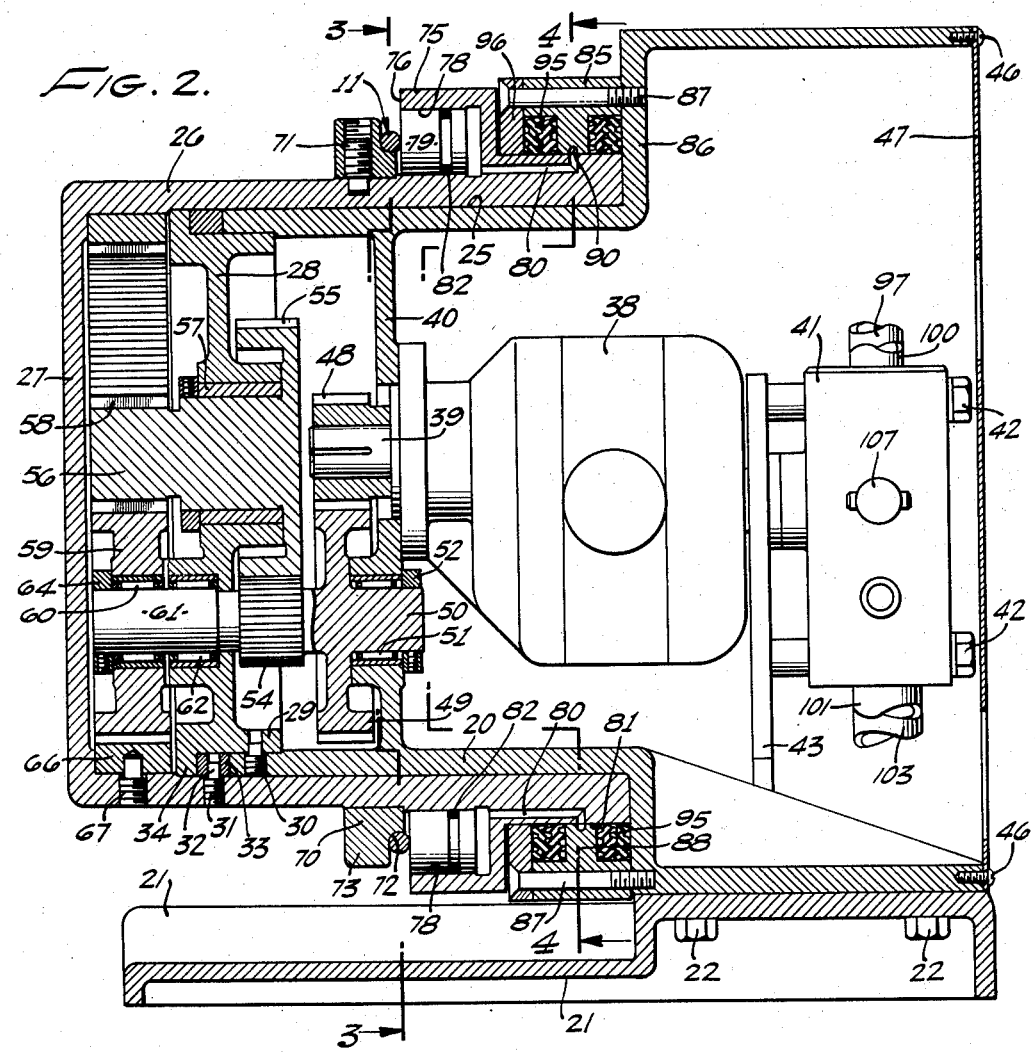
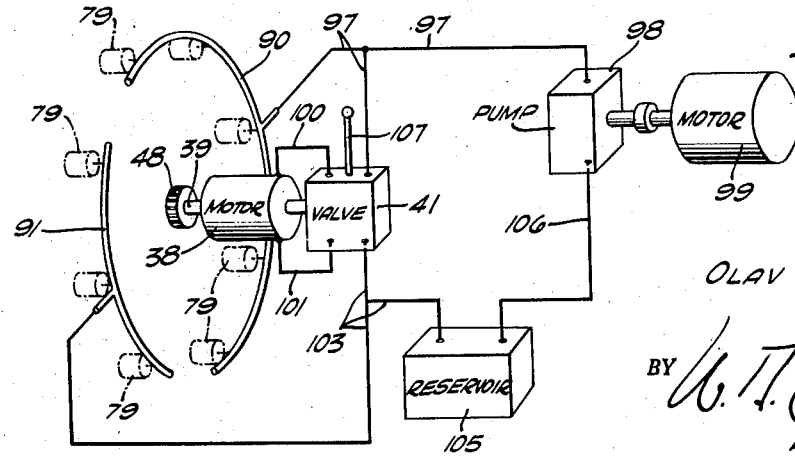
OLAV O. BERGE
INVENTOR.
BY
ATTORNEY Sept. 23, 1958     O. O. BERGE     2,853,273
ROPE DRUM DEVICE
Filed May 13, 1957     3 Sheets-Sheet 3
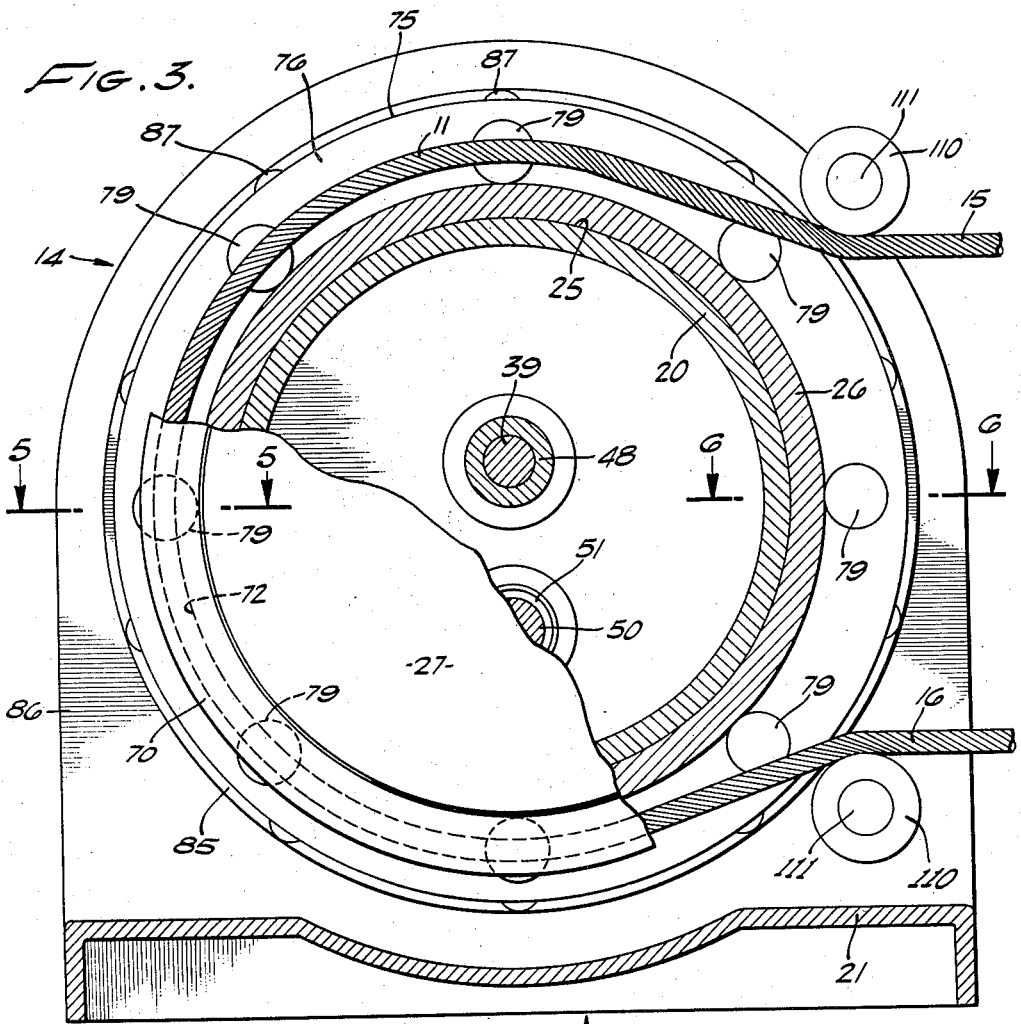
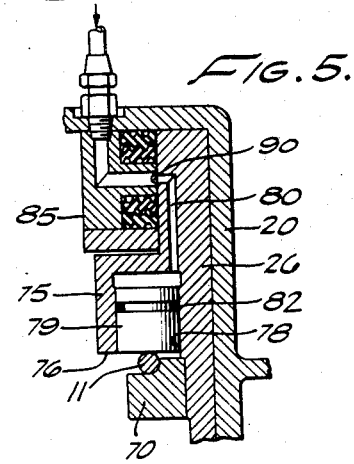
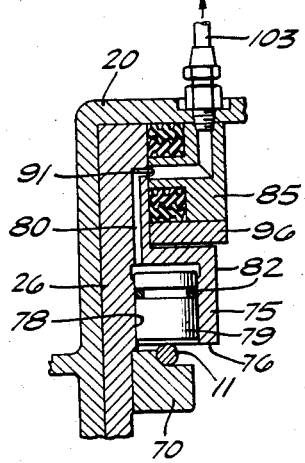
OLAV O. BERGE
INVENTOR.
BY
ATTORNEY

United States Patent Office 2,853,273
Patented Sept. 23, 1958

2,853,273

ROPE DRUM DEVICE

Olav O. Berge, Los Angeles, Calif., assignor to Thor Power Tool Company, Aurora, Ill., a corporation of Delaware Application May 13, 1957, Serial No. 658,716

7 Claims. (Cl. 254—147)

This invention relates to material handling devices and more particularly to an improved power unit featuring a unique rope drum for transmitting power to a rope or cable passing over the drum.

In the handling of material over short distances both horizontally at ground level and vertically as by an elevator, resort is often had to a power transmitting means in the form of a rope or cable passing through a sheave anchored remotely from the drum and wherein the ends of the rope are attached to separate power-driven drums. A bucket, scoop, skid or other material handling device is fixed to one run of the rope loop and is movable in either direction depending on the direction in which the two drums are driven and the direction of pull applied by the rope. In this arrangement one end of the rope is stored on one drum as an equal length of rope is dispensed from the other drum, each drum being commonly provided with braking means as well as with means for driving the drums in opposite directions. Although such equipment has been widely used in the handling of bulk material, such as coal, ore, earth, and many others, it is subject to certain shortcomings and disadvantages obviated by the present invention. For example, prior devices required in excess of three times as much rope as the maximum distance over which material is to be moved, or 50 percent more rope than that required by the use of the present invention. Furthermore, and of greater significance, is the dependence on dual cable drums of large capacity, on brake devices for each, and on selectively operable drive means for rotating the drums in opposite directions.

The simplified design of the present invention avoids these and other shortcomings by utilizing a power-driven clutch to drive an endless rope loop between a suitable sheave at one end and a control station remote from the sheave. One or more material handling devices are fixed to one or both runs of the rope loop for movement either toward or away from the sheave, depending upon the direction of rotation of the rope-supporting drum forming part of the rope clutch. An important feature of the arrangement is that the rope passes around the driving drum without being stored, thereby avoiding the need for excess rope and of storage means therefor.

Accordingly, it is a principal object of the present invention to provide a power unit for transmitting power through a rope in either direction in an improved and facile manner.

Another object of the invention is the provision of a power unit utilizing a rope loop as a power transmitting medium and making use of automatically actuated means for clutching and declutching the rope with respect to a rotating power source.

Another object of the invention is the provision of a power unit for transmitting power to a rope and making use of automatically actuated hydraulic means for gripping the rope as it passes over an annular seat carried by a power drive rotatable selectively in opposite directions.

Another object of the invention is the provision of a self-contained power unit operable to transmit power through a flexible rope and utilizing a common motor to rotate a rope-supporting drum as well as a hydraulic system for automatically clutching and declutching the rope as it passes onto and off from the drum during its rotation.

Another object is the provision of a self-contained drive unit for transmitting power by a rope and featuring compactness, ruggedness, and a novel rope clutching mechanism.

These and other more specific objects will appear upon reading the following specifications and claims and upon considering in connection therewith the attached drawings to which they relate.

Referring now to the drawings in which a preferred embodiment of the invention is illustrated:

Figure 2 is a vertical sectional view through the power unit on line 2—2 of Figure 1;

Figure 3 is a cross-sectional view through the power unit taken along line 3—3 on Figure 2 and shows certain details of the rope clutching mechanism;

Figure 5 is an enlarged fragmentary view taken along line 5—5 on Figure 3; and shows one of the pistons clutching the rope against its supporting seat;

Figure 6 is a view similar to Figure 5 taken along line 6—6 on Figure 3 and shows one of the pistons retracted or declutched from the rope; and Figure 7 is a schematic view of the hydraulic system.

Figure 1:
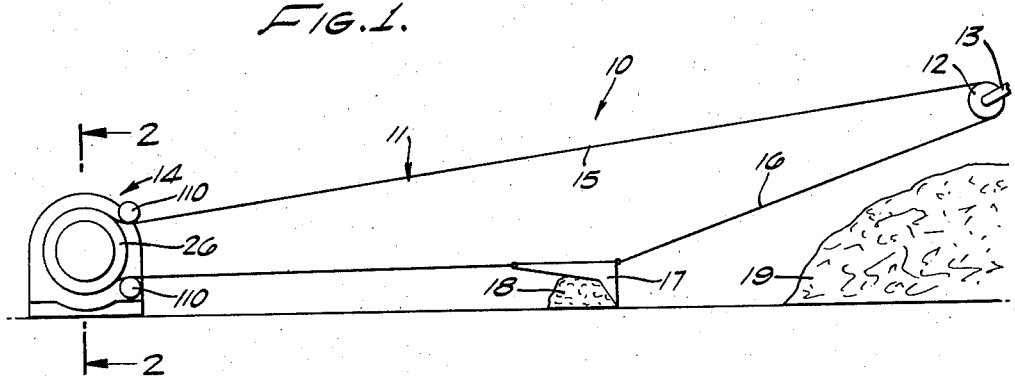
Figure 1 is a vertical side view of a dragline incorporating the features of the present invention.

Referring to the drawings and particularly to Figure 1 there is shown a dragline designated generally 10, incorporating the features of the invention. It will be understood, however, that this application of the invention is merely illustrative, the invention also being applicable with attendant advantages to vertical working arrangements, as for example, to a material elevator for use in the construction of buildings. In this latter application the rope supporting sheave may be connected to the upper part of an elevator shaft, to scaffolding, or to the building skeleton. Material handling platforms, buckets or other devices may be connected to either or both runs of the rope loop and used to transport material to different levels of the building undergoing construction.

Dragline 10, representing a typical embodiment of the invention, includes an endless power transmitting cable or rope 11 having one portion thereof looped about a sheave pulley 12, the yoke 13 of which is suitably anchored to a post or other fixed support. The opposite looped end of rope 11 encircles the annular seating ring of a combined rope clutching driving unit designated generally 14. Rope loop 11 is seen to include two generally parallel runs 15 and 16, the latter of which is secured to a dirt handling scoop 17 of conventional design by means of which a load of dirt 18 can be removed from a supply pile 19 and transported to a desired point adjacent power driving unit 14. It will be understood that scoop 17 may be replaced with a skid, bucket, scraper or other device suitable for handling material along the length of the dragline.

Figure 4:
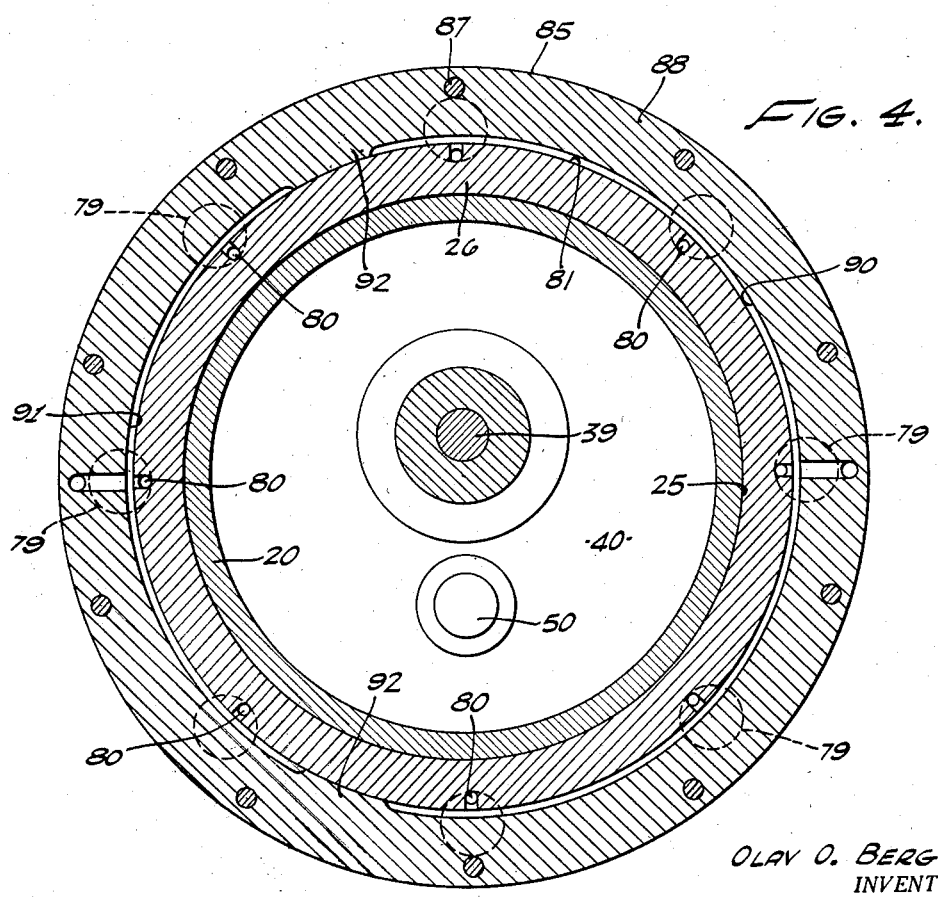
Figure 4 is a transverse sectional view showing the hydraulic fluid supply and discharge passages and is taken along line 4—4 on Figure 2.

Referring now to Figures 2, 3 and 4, power driving unit 14 is seen to comprise a stepped cylindrical housing 20 secured to a base 21 as by cap screws 22. An accurately ground cylindrical surface 25 of housing 20 provides a journal seat for an enclosing sleeve 26 closed at one end by an integral end wall 27. Sleeve 26 is held in assembled relation on surface 25 by a spider ring 28 having an axial flange 29 locked to housing 20 by set screws one of which is indicated at 30. Cooperating with set screws 30 is a second set of screws one of which is indicated at 31. The outer end of each set screw 31 is accessible from the exterior of the sleeve 26 and its inner end 32 seats in an opening formed in a thrust bearing ring 33 interposed between the end of housing 20 and radial flange 34 on spider ring 28.

Enclosed by housing 20 is a suitable power unit such as a hydraulic motor 38 having one end of its shaft 39 extending through partition 40 of the housing casting, the casing of the motor being suitably secured to the partition by unshown cap screws. The other end of the motor 38 may be anchored to one face of a bracket 43 supporting a suitable reversing valve 41 for motor 38 such, for example, as a conventional type open center four way hydraulic valve connected in circuit as will be described presently. Valve 41 may be secured by cap screws 42 to a bracket 43 rigid with housing 20. Motor 38 and valve assembly 41 are accessible through the large end of housing 20 which is normally closed by a removable cover plate 47 held in place by screws 46.

The gear reduction mechanism interconnecting driving motor 38 and sleeve 26 includes a pinion 48 keyed to shaft 39 and meshing with a gear 49 mounted on a stud shaft 50. The latter is journaled in a roller bearing 51 carried by partition 40 and held assembled thereto by a keeper ring 52. Fixed to the side of gear 49 spaced from wall 40 is a pinion 54 meshing with a gear 55 integral with a shaft 56 journaled in a bearing sleeve 57 mounted centrally of spider ring 28. The outer and opposite end of shaft 56 is provided with gear teeth 58 meshing with the teeth of an idler gear 59 journaled on roller bearings 60 supported by a shaft 61 forming a continuation of shaft 50. The mid-portion of shaft 61 is journaled in roller bearings 62 carried in an opening through spider 28, gear 59 being held assembled to the outer end of shaft 61 by a keeper ring 64. Gear 59 also meshes with an encircling toothed ring 66 fixed to sleeve 26 adjacent end plate 27 by one or more set screws 67. The described reduction gearing interposed between pinion 48 on the motor shaft and sleeve 26 is effective to rotate the latter slowly and with great torque by means of a relatively small high speed driving motor, such as hydraulic motor 38.

Encircling the mid-portion of sleeve 26 is a ring 70 secured in place as by a plurality of set screws 71. Ring 70 is provided with an annular curved seat 72 for rope 11 and includes a high strength radial flange 73 flanking one face of the groove. It will be understood that ring 70 forms the fixed portion of the automatic rope clutch. Cooperating with ring 70 and forming an essential part of the rope clutch is a piston housing ringlike enlargement 75 which shall be referred to as a ring and which is an integral part of sleeve 26. Ring 75 has a radial face 76 spaced closely adjacent the non-flanged side of rope groove 72 in the manner clearly shown in Figure 2. As is best understood by reference to Figures 3 and 4, ring 75 is provided with a plurality of circumferentially spaced axial bores 78 for seating separate pistons 79 movable toward and from the rope 11. The inner ends of each bore 78 connect to a channel 80 the opposite end of which opens radially outward through the accurately ground surface 81 of sleeve 26. Pistons 79 each have an annular groove seating a sealing O-ring 82.

The means for controlling the flow of hydraulic fluid to the inner ends of the pistons 79 includes a ring 85 encircling the inner end of sleeve 26 and secured to the radially flanged portion 86 of housing 20 by screws 87. Ring 85 is provided with an inwardly projecting radial flange 88 having an inner surface accurately ground as to have a close running fit with surface 81 of sleeve 26. As is best shown in Figure 4 the inner cylindrical surface of flange 88 is formed with a pair of arcuate fluid distributing grooves 90 and 91 separated from one another by non-grooved barrier portions 92, 92. As shown in Figures 4 and 7, groove 90 provides an inlet passage for pressurized hydraulic fluid and has a circumferential extent of 200° or more whereas the exhaust fluid groove 91 has an arcuate extent of approximately 125°. However, it will be understood that the relative arcuate extent of grooves 90 and 91 may vary within wide limits depending upon the particular application and the arc of contact of rope 11 with rope seating ring 70. Generally speaking it is desirable that the arc of inlet groove 90 correspond with the arc of rope contact with the seating ring. It is made clear by Figures 2 and 4 that grooves 90 and 91 overlie the outer ends of the fluid distributing passages 80 leading to the inner ends of individual bores 78 seating the pistons 79.

To prevent leakage of the high pressure hydraulic fluid from grooves 90 and 91 and the communicating ends of distributing passages 80 there are provided on the opposite sides of radial flange 88 suitable seals 95. One seal is held compressed between flange 88 and the flange 86 of the housing 20. The second seal is held compressed against the other face of flange 88 by an end ring 96 held assembled by the screws 87.

The hydraulic circuit, diagrammatically shown in Figure 7, comprises an outlet conduit 97 connected between the outlet or high pressure side of a hydraulic pump 98 driven by an electric motor 99, the other end of conduit 97 having a branch connected to the high pressure arcuate fluid distributing groove 90 and the other to the high pressure inlet of the reversible control valve 41. A pair of similar conduits 100 and 101 interconnect hydraulic motor 38 and reversing valve 41 in known manner to provide reversible fluid flow circuits between these assemblies, it being understood that each is alternately operable as the high and low pressure flow conduit necessary to effect reverse driving of motor 38 and of the rope drum operated thereby. The low pressure arcuate exhaust groove 91 opens into the fluid return conduit 103 leading to the fluid reservoir 105, it being noted that this conduit has a branch opening into the fluid return passage of reversing valve 41. A final conduit 106 extends between a bottom portion of reservoir 105 and the inlet of pump 98.

If desired, the arcuate contact of the rope with clamping ring 70 can be increased advantageously by the use of idler rollers 110 carried on stub shafts 111 suitably anchored to the power unit housing. Rollers 110 serve not only to increase the length of arcuate contact but as means for guiding the rope runs accurately on to and from the seating groove 72. It will also be appreciated that close spacing of these rollers serves to increase the arc of rope contact with the clutch mechanism and additionally permits the rope runs to be misaligned with the clutching mechanism without interference with its operating efficiency.

The mode of operation of the described apparatus will be apparent from the description of its components. Installation in preparation for use is accomplished by suitably anchoring power unit 14 to the ground and then pulling rope loop 11 taut by applying tension between pulley sheave 12 and its anchorage. To use the device to haul dirt from pile 19 to any desired point closer to the power unit the operator manipulates a reversible control lever 107 (Figure 7) in a direction to drive the motor 38 in a direction to rotate sleeve 26 and rope supporting ring 70 clockwise as illustrated in Figure 1. The motor operates through the gear reduction mechanism housed within housing 20 to rotate sleeve 26 clockwise. It will be understood that motor 99 driving pump 98 operates continuously to maintain conduit 97 filled with high pressure fluid to exhaust any excess fluid back to reservoir 105 through return conduits 103. Any excess fluid is by-passed back to the reservoir through the return flow passages of control valve 41. Groove 90 is to be understood as being positioned upon the side of the unit spaced from the bucket 17. The pressurized fluid flows through the groove 90 and the distributing channels 80 in communication therewith and into the connected bores 78 behind the associated pistons 79 forcing them against the rope and clamping the latter firmly against groove 72 and the adjacent flange 73. At the same time liquid in exhaust groove 91 and the piston chambers in communication therewith is bled through conduit 103 back to reservoir 105 thereby removing the force tending to urge the pistons affected against the rope 11 and leaving it free to run from the rope groove 72 toward sheave 13 along upper run 15 of the dragline. This run may therefore be considered as the slack run of the dragline whereas the lower run 16 is under tension while scoop 17 is being pulled toward the power unit. Pulling the scoop toward the drum causes the rear edge of the scoop to dig into the dirt pile and separate a load of dirt for transport to a desired dumping area.

In the manner described it will be understood that individual pistons 79 are successively and progressively pressed under high pressure against the rope as lower run 16 passes over the lower idler 110 and onto the rope groove, other of the pistons being retracted and declutched from the rope as their supply passage 80 comes into registry with fluid exhaust groove 91. All the pistons opposite the portion of the rope seated in groove 72 are therefore understood to remain clutched between the pistons and the rope seating ring until they reach a point approaching upper idler roller 110. At this point the fluid distributing passage 80 of each piston passes from communication with pressure groove 90 and, after passing the barrier 92, opens into exhaust groove 91 to allow the liquid to exhaust back to the reservoir 105 and the piston to retract from the rope groove.

The return of scoop 17 to obtain another load is accomplished by pivoting control lever in the opposite direction from its vertical neutral position shifting a spool within valve 41 in a direction to reverse the fluid flow in conduits 100 and 101 thereby reversing the rotation of motor 38 to rotate sleeve 26 and rope seating ring 70 counterclockwise. Since pump 98 always operates to supply pressurized fluid through conduit 97 irrespective of the direction of rotation, the reverse rotation of sleeve 26 does not interfere with the operation of the clutching mechanism which will be understood to continue clutching all portions of rope opposite pistons communicating with pressurized groove 90 and to declutch pistons in communication with exhaust groove 91. However, reversal of motor 38 reverses the direction of rotation of sleeve 26 and places upper run 15 of the dragline under tension as slack rope discharges over the lower idler pulley 110. This operation continues until the scoop is in position again to remove dirt from pile 19. As will be apparent from the foregoing description the device is operable to perform work with equal facility in either direction.

After pile 19 has been removed, sheave 12 may be moved to a different anchorage appropriate for moving dirt from a different pile to the point of use. It will also be understood that the disclosed power unit may be employed to carry material vertically merely by attaching sheave 12 to a suitable point above ground level and making any necessary adjustment in the length of the rope.

While the particular rope power transmitting apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Power-driven material handling equipment comprising a reversible power-driven rope clutch, a sheave adapted for anchorage remotely from said clutch, endless rope means supported in part by said clutch and in part by said sheave and including material handling means fixed to intermediate portions of said rope, said clutch including means for displacing said rope to move said handling means in either direction lengthwise of the rope to any point between said clutch and sheave, said rope clutch including hydraulically actuated means operable to grip said rope and apply tension to one run thereof as said clutch is rotated in one direction and to apply tension to a second run thereof as the clutch is rotated in the opposite direction, said hydraulically actuated means including a plurality of pistons movable laterally toward and away from the rope supported by said clutch, said rope being supported by and in direct contact with an annular seat of said clutch through less than 360 degrees, said pistons being rotatable with said clutch and the rope in contact therewith, and means for holding said pistons firmly against said rope opposite portions of the rope in direct contact with said annular clutch seat and leaving said pistons free for movement away from said clutch seat opposite portions thereof out of contact with said rope.

2. A reversible power-driven device for transmitting power through a rope comprising, a rotatably-supported rope-seating ring having a radial flange projecting from one side thereof, a ring of rope gripping members positioned adjacent the other side of said seating ring from said flange and including a plurality of members movable toward and away from said flange, said members being operable to grip a rope immovably against one portion of said seating ring to apply tension to a rope as said seating ring rotates and being retractable opposite another portion of said seating ring to release a rope, said rope gripping members including a plurality of pistons arranged in a ring adjacent the unflanged side of said seating ring and movable toward and away from a rope supported on said seating ring, hydraulic means for actuating said pistons including a first non-rotating arcuate fluid supply passage in communication with one end of certain of said pistons and connected with the high pressure side of a hydraulic fluid circuit, a second non-rotating arcuate fluid exhaust passage in communication with the remainder of said pistons and connected with the low pressure side of a hydraulic fluid circuit, whereby during the rotation of said seating ring and of said pistons the latter are alternately extended and retracted as they are brought into communication respectively with said fluid supply and exhaust passages.

3. A device as defined in claim 2 including a common power source for rotating said rope seating ring and for pressurizing the fluid in said hydraulic fluid circuit.

4. A power-driven device for transmitting power through a rope comprising, means rotatably supporting a rope seating ring flanked on one side by a radial flange and on the other side by means supporting a plurality of hydraulically actuated pistons movable toward and away from said flanged rope seat to grip a rope supported thereon, a pressurized hydraulic fluid circuit including a relatively long arcuate fluid supply passage encircling a major portion of said device and a relatively short arcuate fluid exhaust passage encircling a minor portion of said device, and means rotating with said pistons having separate passages opening into said supply and exhaust passages as said seating ring rotates whereby a certain number of said pistons are activated by pressurized fluid at all times and others thereof are de-activated by being connected to the low pressure exhaust side of the hydraulic fluid circuit.

5. A compact self-contained self-powered rope hauling device comprising, a hollow housing enclosing a driving motor, a hydraulic pump connected to said motor at one end, gear reduction means connected to said motor and operable to drive a sleeve rotatably supported about said housing, said sleeve having a rope seating ring thereon, means adjacent one face of said ring supporting circumferentially-spaced members independently movable toward and away from said rope seating ring and operable to press a rope immovably thereagainst so that the rope can be placed under tension as the sleeve rotates, hydraulic means for actuating said members including means for supplying fluid under pressure to members through one arcuate portion of said rope seating ring and for exhausting fluid from members opposite another arcuate portion of said ring.

6. A rope power transmitting mechanism comprising an annular housing having a rotatable sleeve journaled for rotation about the exterior thereof, a motor for driving said sleeve, said sleeve having a flanged rope seating groove, a plurality of pistons supported in a ring laterally of said groove having outer ends movable toward and away from said groove and rotatable along with said sleeve and groove, and hydraulic fluid distributing means including a pair of stationary grooves of arcuate extent, embracing different sectors of said sleeve, and passage means leading from each of said pistons and having an end positioned to open selectively into said grooves as said sleeve rotates about its axis, and means providing a pressurized hydraulic fluid circuit, the pressure side of which opens into one of said arcuate grooves and the suction side of which opens into the other of said grooves, whereby upon rotation of said sleeve a certain number of said pistons are subject to the pressure side of said circuit and a certain number of other pistons are subject to the suction side of said circuit.

7. A rope power transmitting mechanism as defined in claim 6 wherein the driving motor and the hydraulic means are housed substantially within said housing.

References Cited in the file of this patent

UNITED STATES PATENTS

| | | |
|---|---|---|
| 148,728 | Matson | Mar. 17, 1874 |
| 554,023 | Fouts | Feb. 4, 1896 |
| 2,752,797 | Sherwin | July 3, 1956 |